(12) United States Patent
Sato et al.

(10) Patent No.: US 8,153,568 B2
(45) Date of Patent: Apr. 10, 2012

(54) WATER-RESISTANT GREASE AND WATER-RESISTANT-GREASE-ENCLOSED ROLLING BEARING AND HUB

(75) Inventors: Yoji Sato, Mie (JP); Masaki Egami, Mie (JP)

(73) Assignee: NTN Corporation, Osaka (JP)

( * ) Notice: Subject to any disclaimer, the term of this patent is extended or adjusted under 35 U.S.C. 154(b) by 453 days.

(21) Appl. No.: 11/992,376

(22) PCT Filed: Sep. 28, 2006

(86) PCT No.: PCT/JP2006/319266
§ 371 (c)(1),
(2), (4) Date: Mar. 20, 2008

(87) PCT Pub. No.: WO2007/037308
PCT Pub. Date: Apr. 5, 2007

(65) Prior Publication Data
US 2009/0136170 A1   May 28, 2009

(30) Foreign Application Priority Data

Sep. 28, 2005 (JP) ................................ 2005-282315
Mar. 17, 2006 (JP) ................................ 2006-075470
Mar. 17, 2006 (JP) ................................ 2006-075471
Jun. 26, 2006 (JP) ................................ 2006-175284

(51) Int. Cl.
*C10M 169/06* (2006.01)
*C10M 137/10* (2006.01)
*C10M 115/08* (2006.01)
*C07C 309/62* (2006.01)
*B01D 19/04* (2006.01)
*F16C 19/00* (2006.01)

(52) U.S. Cl. ........ 508/390; 508/110; 508/308; 508/370; 508/545; 508/552; 384/462

(58) Field of Classification Search ................. 508/110, 508/390, 308, 370, 545, 552; 384/462
See application file for complete search history.

(56) References Cited

U.S. PATENT DOCUMENTS
6,355,602 B1    3/2002  Okaniwa et al.
(Continued)

FOREIGN PATENT DOCUMENTS
EP    1 764 406 A1    3/2007
(Continued)

OTHER PUBLICATIONS
EP Search Report Dated Aug. 27, 2010.

*Primary Examiner* — Walter D Griffin
*Assistant Examiner* — Vishal Vasisth
(74) *Attorney, Agent, or Firm* — Hedman & Costigan, P.C.; James V. Costigan (57) ABSTRACT

The present invention provides water-resistant grease which improves the resistance to peeling which occurs from the surface of a bearing composed of carbon steel for machine structural use or the like even in a strict lubricating condition in which water may penetrate into the water-resistant grease during the operation of the bearing, and a rolling bearing and a hub bearing which use the water-resistant grease and have a long life. The water-resistant grease is composed of non-water-based base oil, a thickener, and a water dispersant used as an additive. The saturated amount of water dispersible in the water-resistant grease is 30 to 60 wt %. The water dispersant capable of dispersing the water in the water-resistant grease is a surface active agent. The non-water-based base oil is mineral oil. The thickener is a urea-based compound. The present invention also provides a rolling bearing and a hub bearing in which the water-resistant grease is enclosed.

9 Claims, 2 Drawing Sheets

U.S. PATENT DOCUMENTS

| | | | |
|---|---|---|---|
| 2003/0176298 A1* | 9/2003 | Nakatani et al. | 508/398 |
| 2004/0033911 A1* | 2/2004 | Mikami et al. | 508/511 |

FOREIGN PATENT DOCUMENTS

| | | |
|---|---|---|
| EP | 1 900 798 A1 | 3/2008 |
| FR | 2 795 737 A1 | 1/2001 |
| GB | 2 260 142 A | 4/1993 |
| JP | 3-31394 A | 2/1991 |
| JP | 5-171172 A | 7/1993 |
| JP | 9-87652 A | 3/1997 |
| JP | 2003-13083 A | 1/2003 |
| JP | 2003-239999 A | 8/2003 |
| JP | 2004-018725 A | 1/2004 |
| JP | 2004-51912 A | 2/2004 |
| JP | 2004-169862 A | 6/2004 |
| JP | 2004-269789 A | 9/2004 |
| JP | 2004-346120 A | 12/2004 |
| JP | 2005-195165 A | 7/2005 |
| JP | 2006-016441 A | 1/2006 |
| WO | WO 2006/435666 A1 | 4/2006 |

* cited by examiner

WATER-RESISTANT GREASE AND WATER-RESISTANT-GREASE-ENCLOSED ROLLING BEARING AND HUB

This application is a 371 of PCT/JP2006/319266, filed Sep. 28, 2006.

TECHNICAL FIELD

The present invention relates to water-resistant grease enclosed in a bearing used in environment where there is a danger that water may penetrate into the bearing and to a rolling bearing and a hub bearing in which the grease is enclosed.

BACKGROUND ART

As a bearing (hub bearing) for a car body which can be exemplified as a representative bearing used in environment in which water penetrates thereinto, in the 1980s, to improve operability in mounting it on the car body, car makers came to adopt a double row angular contact ball bearing or a double row tapered roller bearing in which outer rings of a back-to-back duplex bearing were held together as a unit. These hub bearings are called the first-generation hub bearing. By holding the outer rings together as a unit, an initial axial gap was set to a proper value in assembling the hub bearing. Thus it was unnecessary to adjust a preload in mounting the hub bearing on the car body. Thereafter a double row bearing called the second-generation hub bearing was developed by providing the outer ring of the first-generation hub bearing with a flange portion. Because merely arranging two standard bearings has a limitation in a decrease of the weight and size of the hub bearing, the hub bearing, a shaft (hub ring), and a housing (knuckle) which are peripheral parts of the hub bearing were held together as a unit to decrease the number of parts and the weight of the hub bearing. By changing the method of fixing of the hub bearing to the knuckle from press fit to bolt tightening, it became easy to mount the hub bearing on the car body. Further in the third-generation hub bearing, the shaft (hub ring) and the inner ring of the hub bearing are held together as a unit to decrease an excess metal and improve the line-assembling efficiency. Recently the fourth-generation hub joint in which the hub bearing and a constant velocity joint are held together as a unit has been developed.

To facilitate an operation of mounting the automotive hub bearing on the car body and make the hub bearing lightweight and compact, recently the second and third generation hub bearings are increasingly adopted.

Paying attention to the material of the hub bearing, in the first-generation hub bearing, bearing steel (for example, SUJ2) was used for inner and outer rings. Carbon steel for machine structural use such as S53C which has a favorable forgeability and is inexpensive came to be used for the second and third generation hub bearings having the flange mounted on the outer ring. The rolling fatigue strength of the bearing portion is secured by heat-treating the raceway portion consisting of the carbon steel for machine structural use with a high-frequency wave. But the carbon steel for machine structural use has a low surface strength because it contains a small amount of an alloy component and is thus inferior to the bearing steel in the resistance to peeling that occurs from the surface thereof. Therefore when the same lubricating specification as that for the first-generation hub bearing is applied to the second and third generation hub bearings, the second and third generation hub bearings have durability inferior to that of the first-generation hub bearing when lubricating condition is strict.

The automotive hub bearing is operated not only in fine weather but also in very bad use conditions such as in rainy weather and on bad roads and seashores. Although the penetration of water or a foreign matter into the hub bearing is restrained by sealing member, it is impossible to construct the sealing member capable of entirely sealing the hub bearing. Thus the hub bearing is not immune from the penetration of the water or the foreign matter thereinto. Further the hub bearing is demanded to have a low torque from the standpoint of energy saving. As one of methods of allowing the hub bearing to have a low torque, a light contact of the seal with an outer ring or the like is conceivable. Therefore there is a higher possibility that the water penetrates into the bearing and that the lubricating state inside the bearing becomes bad. This problem is common to the hub bearing of each generation. In the hub bearings of the second, third, and fourth generations using the carbon steel for machine structural use as the material thereof, there is a higher possibility that peeling occurs from the surface thereof when the lubricating state is bad.

Regarding the improvement of the water-resistant grease, the decrease of the rotational torque by adopting the low-viscosity base oil (see patent document 1) and the impartation of conductivity for the removal of static electricity (see patent document 2) are known. But no consideration has been made to maintain the performance of the bearing in preparation for the penetration of water into grease.

The penetration of water into the bearing causes the following problems to occur: When waterdrops penetrate into a region thereof to which a load is applied, an oil film is broken and thus disadvantageous in the lubricating performance and metal contact occurs. Consequently there is a danger that the bearing may wear and peel (smearing and the like) from the surface thereof or peel in an early stage. The early-stage peeling means peeling that generates a white tissue change in the neighborhood of the surface of the bearing and also peeling which develops crack in the neighborhood of the surface thereof in a direction in which rolling elements roll and a direction opposite to the rolling direction thereof. In dependence on the state of the presence of the water inside the bearing, rust is generated inside the bearing.

Patent document 1: Japanese Patent Application Laid-Open No. 2003-239999

Patent document 2: Japanese Patent Application Laid-Open No. 2004-169862

DISCLOSURE OF THE INVENTION

Problems to be Solved by the Invention

The present invention has been made to solve the above-described problems and has for its object to provide water-resistant grease which improves the resistance to peeling that occurs from the surface of a bearing composed of carbon steel for machine structural use even in a strict lubricating condition in which water may penetrate into the bearing during an operation thereof, and a long-lived rolling bearing and hub bearing in which the grease is enclosed.

Means for Solving the Problems

The water-resistant grease of the present invention comprises base grease consisting of non-water-based base oil and a thickener and an additive added to the base grease. The additive contains at least a water dispersant capable of uniformly dispersing water in the water-resistant grease. A mixing amount of the water dispersant is so selected that a saturated amount of water dispersible in the water-resistant grease is allowed to be 30 to 60 wt %.

In the present invention, the saturated amount of water means a maximum amount of water which can be dispersed as very fine particles in the grease.

The water dispersant capable of dispersing water in the water-resistant grease is a surface active agent.

The surface active agent is calcium sulfonate or/and sorbitan monooleate.

0.5 to 2 parts by weight of the calcium sulfonate and 0.2 to 1 part by weight of the sorbitan monooleate are added to 100 parts by weight of the base grease. When the calcium sulfonate and the sorbitan monooleate are used singly, it is preferable to add 1.5 to 4 parts by weight of the calcium sulfonate and 0.4 to 2 parts by weight of the sorbitan monooleate to 100 parts by weight of the base grease.

The additive contains zinc dithiophosphate and an amine-based antioxidant.

Two parts by weight of the zinc dithiophosphate and one part by weight of the amine-based antioxidant are added to 100 parts by weight of the base grease.

A basic value of the calcium sulfonate is 50 to 500. In the present invention, the basic value indicates the amount of a basic substance contained in one molecule thereof and is measured in accordance with the method specified in JIS K 2501.

The non-water-based base oil composing the water-resistant grease of the present invention is mineral oil. The thickener is a urea-based compound expressed by a formula (1) shown below. 1 to 40 parts by weight of the thickener is added to 100 parts by weight of the base grease.

[Chemical formula 2]

(1)

(where $R^2$ indicates an aromatic hydrocarbon group having 6 to 15 carbon atoms, and $R^1$ and $R^3$ indicate at least one hydrocarbon group selected from among an alicyclic hydrocarbon group and the aromatic hydrocarbon group.)

The diameter of a particle of water dispersed by the water dispersant is not more than 50 μm when the base grease has a water content of 20 wt % for a total of amounts of the base grease, the water dispersant, and the water.

In the present invention, the diameter of the water particle is the diameter of a waterdrop dispersed in the base grease, having a water content of 20 wt %, which is spread on a glass plate at a load of 600 N by a microscope. The diameter of the waterdrop is measured by a microscope and indicated in a numerical value.

The rolling bearing of the present invention has an inner ring, an outer ring, and rolling elements interposed between the inner ring and the outer ring. The above-described water-resistant grease is enclosed on a periphery of the rolling elements.

Figure 2:
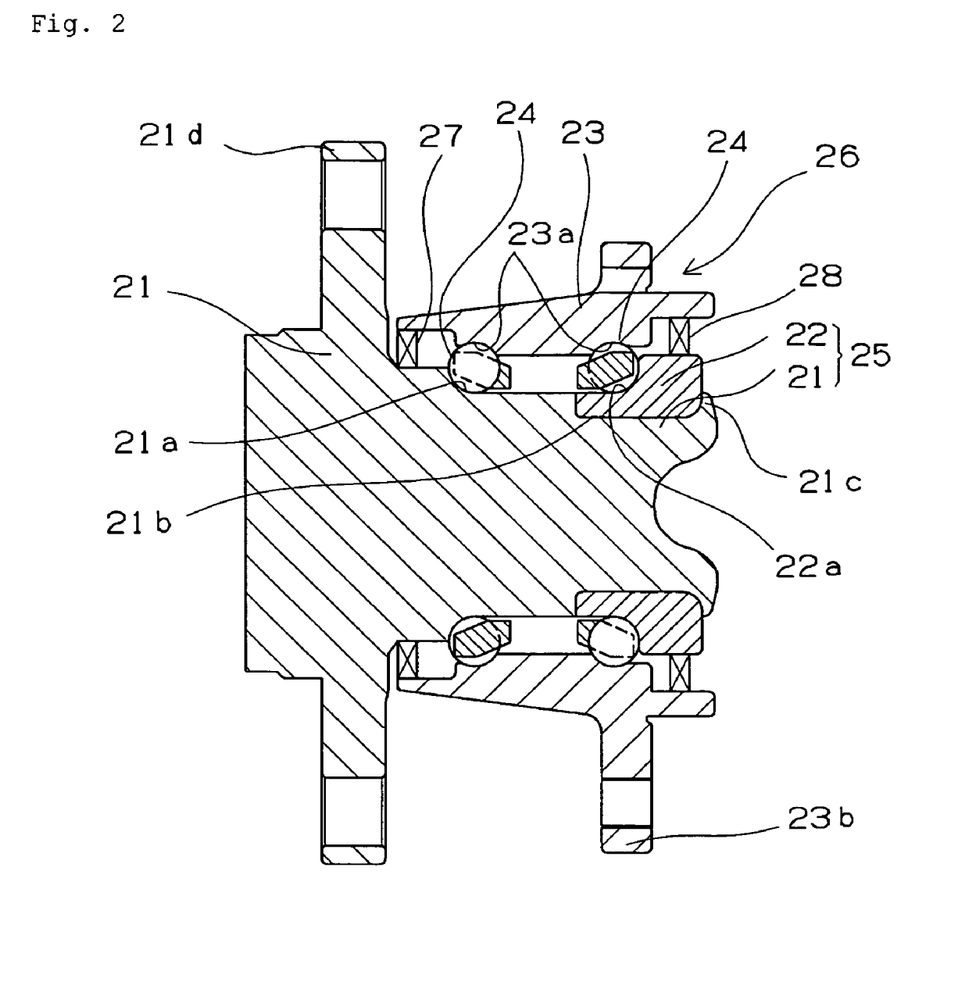
FIG. 2 is a sectional view of a hub bearing.

The water-resistant grease is enclosed in the hub bearing of the present invention which has a sliding portion composed of carbon steel for machine structural use and is used for a car or a railway vehicle. As shown in FIG. 2 showing a hub bearing 26, the above-described sliding portion means a rolling contact portion between an inward member 25 having a hub ring 21 and an inner ring 22 as well as an outward member 23 consisting of an outer ring and double row rolling elements 24, 24 interposed between the inward member 25 and the outward member 23. The water-resistant grease of the present invention is enclosed in an annular space surrounded with the inward member 25, the outward member 23, and two sealing members 27, 28 which seal the gap between both members 25, 23 and are mounted with the two sealing members 27, 28 axially sandwiching the double row rolling elements 24, 24 there between.

EFFECT OF THE INVENTION

The water-resistant grease of the present invention is enclosed in the bearing. The grease comprises the base grease consisting of the non-water-based base oil and the thickener, and the dispersant, allowing very fine particles of water to be dispersed in the grease, which is added to the base grease in such a way that the saturated amount of water is adjusted to 30 to 60 wt %. Therefore the water which has penetrated into the bearing can be dispersed in the water-resistant grease as very fine particles. Thereby even though the water is mixed into the grease, the grease is capable of restraining the action of the water that prevents the grease from forming the oil film.

Regarding the rust-preventive action, it is possible to decrease the area of the contact between steel composing the bearing and the mass of a water component. Thereby it is possible to restrain the generation of rust.

Because the water-resistant grease of the present invention contains the dispersant therein, it is possible to disperse the water which has penetrated into the bearing as very fine particles having diameters not more than a given diameter. Therefore even though the water is mixed into the grease, the grease is capable of restraining the action of the water which inhibits the grease from forming the oil film.

Therefore the water-resistant grease is capable of preventing the bearing from peeling starting from the surface thereof and allows the bearing in which the water-resistant grease is enclosed to have a long life even though the lubricating condition is strict.

The hub bearing of the present invention has the sliding portion composed of the carbon steel for machine structural use and is provided with the water-resistant grease enclosed therein. Thereby even though the water is mixed into the hub bearing, the water-resistant grease is capable of restraining the action of the water that inhibits the grease from forming the oil film. Therefore the water-resistant grease is capable of preventing the carbon steel for machine structural use for the hub bearing from peeling from the surface thereof and allows the hub bearing to have a long life, even though the lubricating condition is strict.

BEST MODE FOR CARRYING OUT THE INVENTION

Investigation has been made on the durability of a bearing which is used in a place where there is a danger that water may penetrate thereinto. The bearing is composed of carbon steel for machine structural use and of a material, heat-treated with a high-frequency wave, that partly composes the bearing and is disposed at a sliding portion on which a rolling element slides. Consequently it has been found that the bearing optimized by controlling the affinity of the grease for the water by means of an additive has a long life without deteriorating the lubricating performance of the sliding surface thereof, even though the water penetrates thereinto. It has been also found that the water which has penetrated into the bearing can be captured in the grease by dispersing the water in the grease as very fine waterdrops.

It has been found that the grease whose saturated amount of water is adjusted to a proper extent by containing a dispersant capable of dispersing the water in the grease as very fine particles does not deteriorate the lubricating performance of the rolling contact portion of the bearing but keeps it, even though the water penetrates into the bearing. This is considered as follows: In the case of the grease in which the saturated amount of water has been adjusted to the proper degree, the water which has penetrated into the bearing is dispersed in the grease as very fine particles and is enclosed in the grease which can be present as a continuous phase. Thus the water is incapable of preventing the grease from forming an oil film. Thereby the durability of the bearing can be improved. The present invention is based on this finding.

The water-resistant grease of the present invention is obtained by mixing the additive containing the dispersant capable of dispersing water in the base grease composed of the non-water-based base oil and the thickener and has specified affinity for the water which penetrates into the bearing. A numerical value indicating the affinity for the water is called "saturated amount of water" and defined as expressed by an equation shown below:

Saturated amount of water (wt %)=Maximum amount of water dispersible in grease×100/(Weight of grease+Maximum amount of water dispersible in grease)

In the water-resistant grease of the present invention, the mixing amount of the water dispersant is so set as to allow the saturated amount of water expressed by the above equation to be in the range from 30 to 60 wt % and favorably in the range from 40 to 50 wt %. In this range, the water-resistant grease is capable of restraining the action of the water that prevents the grease from forming the oil film.

When the water dispersant is mixed with the base grease to such an extent that the saturated amount of water is less than 30 wt %, it is difficult to capture the water in the water-resistant grease. Consequently the water which has penetrated into the bearing is present therein as large waterdrops and inhibits the formation of the oil film. When the water dispersant is mixed with the base grease to such an extent that the saturated amount of water is more than 60 wt %, the amount of the water held inside the bearing is so large that rust is generated.

The diameter of the particle of water dispersed in the grease by the water dispersant is not more than 50 μm, when the water content is 20 wt % for the total of the amounts of the base grease, the water dispersant, and the water. When the diameter of the waterdrop is not more than 50 μm, the water does not restrain the water-resistant grease from forming the oil film. The diameter of the waterdrop is favorably not more than 30 μm and more favorably in the range of 5 to 25 μm. When the diameter of the waterdrop is 50 μm or more, the water prevents the water-resistant grease from forming the oil film and extremely shortens the life of the bearing.

As the dispersant capable of uniformly dispersing water in the grease and adjusting the saturated amount of water to the proper extent, a surface active agent can be used. The surface active agent is used to disperse the water in the grease so that neither oil film breakage nor rust occurs and the water is unharmful, even though the water penetrates into a hub bearing. The water which has penetrated into the grease is dispersed in the grease as very fine particles by the surface active agent. Because the grease can be present as a continuous phase, it is conceivable that the oil film breakage does not occur.

The water particle, forming an uncontinuous phase, which is trapped in the grease present as the continuous phase has a very low probability of contacting the carbon steel for machine structural use constructing the body of the hub bearing. The water particle that attaches to the carbon steel for machine structural use at a low probability is immediately replaced with the grease present as the continuous phase owing to the rotation of a rolling element interlocked with the rotation of the hub bearing body. Thus it is considered that the water particle is incapable of rusting the carbon steel for machine structural use.

The surface active agent that can be used in the present invention is of a W/O (state in which water phase is dispersed in oil phase (grease)) type easily capturing the water particle as the uncontinuous phase in the grease present as the continuous phase. It is preferable that an HLB (Hydrophilic-Lipophilic Balance) value indicating the extent of the affinity of the surface active agent for the water and the oil is in the range of 5 to 18.

As the surface active agent that is used in the present invention, it is possible to list a glycol-based surface active agent such as polyalkylene glycols, alkylene glycol carboxylates, and polyalkylene glycol carboxylates; a glycerin-based surface active agent such as glycerin carboxylates, polyoxyalkyl glycerin carboxylates, and glyceryl carboxylates; a glyceryl-based surface active agent such as polyglyceryl carboxylates and polyoxyalkyleneglyceryl carboxylates; an ether-based surface active agent such as polyoxyalkylenealkyl ethers and polyoxyalkylenealkyl ether carboxylates; an ester-based surface active agent such as polyoxyalkylenealkyl ether diester carboxylates and sorbitan esters; a castor oil-based surface active agent such as polyoxyalkylene hardened castor oils and polyoxyalkylene carboxylate hardened castor oils; a polyoxyalkylenetrimethylolpropane carboxylate-based surface active agent; a metal sulfonate-based surface active agent; and a sorbitan ester-based surface active agent.

Of these surface active agents, the metal sulfonate-based surface active agent, the polyalkylene glycol carboxylate-based surface active agent, and the sorbitan ester-based surface active agent are favorable. Calcium sulfonate and sorbitan monooleate are especially favorable.

The metal sulfonate-based surface active agent, the polyalkylene glycol carboxylate-based surface active agent, and the sorbitan ester-based surface active agent allow the saturated amount of water to be in the range of 30 to 60 wt % within the mixing ratio described below.

The mixing ratio of the surface active agent which can be used in the present invention is favorably 0.4 to 4 parts by weight for 100 parts by weight of the base grease which comprises the non-water-based base oil and the thickener. When the mixing ratio of the surface active agent is less than 0.4 parts by weight, the saturated amount of water cannot be made not less than 30 wt %. Thus it is difficult to obtain the intended effect to a sufficient extent. Further because the amount of the surface active agent is insufficient, the diameter of the water particle exceeds 50 μm. Thus the lubricating oil film of the grease is not sufficiently formed. Therefore it is difficult to obtain the intended effect to a sufficient extent. On the other hand, when the mixing ratio of the surface active agent is more than four parts by weight, there occurs a case in which the saturated amount of water exceeds 60 wt %. Thus there is no increase in the intended effect in the oil film formation rate and the like. Further although the diameter of the water particle is smaller than 50 μm, there is no increase in the effect of dispersing the water, which deteriorates the properties of the grease indicated by the life of the bearing or the like.

In the present invention, of additives to be added to the base grease, it is preferable to use calcium sulfonate and sorbitan monooleate as the surface active agent which is the water dispersant capable of dispersing the water in the grease.

The basic value of the calcium sulfonate that can be used in the present invention is preferably in the range from 50 to 500. The basic value indicates the amount of a basic substance contained in one molecule thereof. When the amount of Ca contained in the additive is large, the basic value is large. The basic calcium sulfonate is capable of imparting not only rust-preventive performance but also extreme-pressure performance to the base grease.

That is, in the present invention, supposing that 0.5 to 2 parts by weight of the calcium sulfonate is added to 100 parts by weight of the base grease, the extreme-pressure performance is insufficient when the basic value is less than 50, and a higher effect cannot be obtained when the basic value is more than 500.

The sorbitan monooleate which can be used in the present invention is a nonionic surface active agent, has about nine in the HLB value indicating the extent of the affinity thereof for water and oil, and is lipophilic. The sorbitan monooleate is used together with the calcium sulfonate to secure the dispersibility of the base oil in the water-resistant grease.

In the present invention, it is preferable that the mixing amount of the calcium sulfonate serving as the surface active agent and that of the sorbitan monooleate also serving as the surface active agent are 0.5 to 2 parts by weight and 0.2 to 1 part by weight respectively for 100 parts by weight of the base grease.

When the calcium sulfonate and the sorbitan monooleate are used singly, it is preferable to add 1.5 to 4 parts by weight of the calcium sulfonate and 0.4 to 2 parts by weight of the sorbitan monooleate to 100 parts by weight of the base grease.

By using both the calcium sulfonate and the sorbitan monooleate in combination in the above-described range, it is possible to adjust the saturated amount of water of the water-resistant grease to 30 to 60 wt %. Further there is no fear that the intended effect cannot be attained in an oil film formation factor and the like and that the property of the grease indicated by the life of the bearing or the like deteriorates.

The water-resistant grease of the present invention is capable of containing other additives. It is especially preferable that the water-resistant grease contains an extreme-pressure agent and an antioxidant. It is preferable to use zinc dithiophosphate as the extreme-pressure agent imparting extreme-pressure performance to the water-resistant grease and an amine-based antioxidant as the antioxidant.

As the zinc dithiophosphate, zinc dialkyldithiophosphate expressed by a formula (2) shown below can be used in the present invention to impart the extreme-pressure performance to the grease.

[Chemical formula 3]

(2)

(in the formula, R denotes alkyl group.)

As the alkyl group, a primary alkyl group, a secondary alkyl group, and an aryl group are listed. It is preferable to use the secondary alkyl group having a favorable balance among stability for water, wear-preventing property, and the like.

The mixing amount of the zinc dithiophosphate is favorably 0.5 to 2.0 parts by weight and most favorably 2.0 parts by weight for 100 parts by weight of the base grease.

When the mixing amount of the zinc dithiophosphate is less than 0.5 parts by weight, the extreme-pressure performance is insufficient and it is difficult to obtain the intended effect to a sufficient extent. When the zinc dithiophosphate is added to the base grease at more than 2.0 parts by weight, an effect higher than the intended effect cannot be obtained.

The amine-based antioxidant that is used in the present invention is added to the base grease to restrain the grease from being deteriorated by oxidation. As the amine-based antioxidant, phenyl-1-naphtylamine, phenyl-2-naphtylamine, diphenyl-p-phenylenediamine, dipyridylamine, phenothiazine, N-methylphenothiazine, N-ethylphenothiazine, 3,7-dioctylphenothiazine, p,p'-dioctyldiphenylamine, and N,N'-diisopropyl-p-phenylenediamine are listed.

The mixing amount of the amine-based antioxidant is favorably 0.5 to 2.0 parts by weight for 100 parts by weight of the base grease. When the mixing amount of the amine-based antioxidant is less than 0.5 parts by weight, the anti-oxidizing performance is insufficient and thus it is difficult to obtain the intended effect to a sufficient extent. When the amine-based antioxidant is added to the base grease at more than 2.0 parts by weight, an effect higher than the intended effect cannot be obtained. The mixing amount of the amine-based antioxidant is most favorably one part by weight for 100 parts by weight of the base grease.

As the non-water-based base oil which can be used for the water-resistant grease of the present invention, it is possible to list mineral oil, poly-α-olefin oil (herein after referred to as PAO oil), ester oil, phenyl ether oil, fluorine oil, and synthetic hydrocarbon oil (GTL base oil) synthesized by Fischer-Tropsch reaction. Mixtures of these non-water-based base oils can be also used.

As the mineral oil, it is possible to use any of conventional lubricants such as naphthene mineral oil, paraffin mineral oil, liquid paraffin, and hydrogenated dewaxed oil and those used in the field of grease.

As the PAO oil, polymers of a-olefin, copolymers of the a-olefin and olefin, and polybutene are listed. These substances are oligomers, low polymers of the α-olefin, having structures in which hydrogen is added to the terminal double bond thereof. The polybutene which is one kind of the α-olefin can be also used. The polybutene can be produced by polymerizing a starting material containing isobutylene as its main component with a catalyst such as aluminum chloride. The polybutene can be used as it is or by hydrogenating it.

As other examples of the α-olefin, it is possible to list 1-octane, 1-nonen, 1-decene, 1-dodecene, 1-tridecene, 1-tetradecene, 1-pentadecene, 1-hexadecene, 1-heptadecene, 1-octadecene, 1-nonadecene, 1-eicosene, 1-docosene, and 1-tetracosene. Normally mixtures of these substances are used.

In consideration of the lubricating performance and cost, of these non-water-based base oils, it is preferable to use the mineral oil.

The non-water-based base oil that can be used in the present invention is liquid at room temperature and has a kinematic viscosity of 30 to 200 mm$^2$/second and favorably 40 to 120 mm$^2$/second at 40° C. If the kinematic viscosity of the non-water-based base oil is less than 30 mm$^2$/second, the non-water-based base oil deteriorates in a short period of time. Because a resultant deteriorated substance accelerates deterioration of the entire non-water-based base oil, the durability of the bearing is decreased and its life becomes short. If the kinematic viscosity of the non-water-based base oil is more than 200 mm²/second, owing to an increase of the rotational torque, the temperature of the bearing rises, which is unpreferable.

The mixing ratio of the non-water-based base oil in 100 parts by weight of the base grease is favorably 60 to 99 parts by weight and more favorably 70 to 95 parts by weight.

When the mixing ratio of the non-water-based base oil is less than 60 parts by weight, the grease is hard and the lubricating performance thereof at a low temperature is low. When the mixing ratio of the non-water-based base oil is more than 99 parts by weight, the grease is soft and liable to leak.

As the thickener which can be used for the water-resistant grease of the present invention, it is possible to use soaps such as Benton, silica gel, fluorine compounds, lithium soap, lithium complex soap, calcium soap, calcium complex soap, aluminum soap, aluminum complex soap; and urea-based compounds such as a diurea compound and a polyurea compound. The urea-based compound is favorable in consideration of heat resistance and cost.

The urea-based compound is expressed by a chemical formula (1) shown below.

[Chemical formula 4]

(1)

($R^2$ indicates an aromatic hydrocarbon group having 6 to 15 carbon atoms. $R^1$ and $R^3$ may be identical to each other or different from each other and indicate at least one group selected from an aromatic group, an alicyclic group, and an aliphatic group each having 6 to 12 carbon atoms.)

The urea-based compound is obtained by reacting an isocyanate compound and an amine compound with each other. To prevent a reactive free radical from remaining unreacted, it is preferable to mix the isocyanate compound and the amine compound with each other such that the isocyanate group of the isocyanate compound and the amino group of the amine compound have an approximately equivalent amount.

The diurea compound shown by the formula (1) is obtained by the reaction between diisocyanate and monoamine. As the diisocyanate, it is possible to list phenylene diisocyanate, diphenyl diisocyanate, diphenyl methane diisocyanate, 1,5-naphtylene diisocyanate, 2,4-tolylene diisocyanate, 3,3-dimethyl-4,4-biphenylene diisocyanate, octadecane diisocyanate, decane diisocyanate, and hexane diisocyanate. As the monoamine, octylamine, dodecylamine, hexadecylamine, stearylamine, oleylamine, aniline, p-toluidine, and cyclohexylamine are listed.

In the present invention, alicyclic-aromatic urea compounds or aromatic urea-based compounds obtained by the reaction between aromatic diisocyanate, alicyclic monoamine, and aromatic monoamine or the reaction between the aromatic diisocyanate and the aromatic monoamine are preferable. It is especially preferable to use cyclohexylamine as the alicyclic monoamine in combination with aniline as the aromatic monoamine.

In the reaction, after monoamine acid and diisocyanates are reacted sufficiently with each other in the non-water-based base oil at a temperature of 70 to 120° C., the temperature is risen to 120 to 180° C. at which the mixture is held for 1 to 2 hours. Thereafter the mixture is cooled and homogenizing treatment is carried out by using a homogenizer, a three-roll mill or the like to obtain base grease to which additives are added.

In the present invention, the mixing ratio of the thickener in 100 parts by weight of the base grease is favorably 1 to 40 parts by weight and more favorably 3 to 25 parts by weight. If the mixing ratio of the thickener is less than one part by weight, the thickening effect is small, and it is difficult to make the base grease grease-like. If the mixing ratio of the thickener is more than 40 parts by weight, the grease becomes so hard that it is difficult to obtain the intended effect.

In the water-resistant grease of the present invention, known additives other than those described above can be added to the base grease as necessary in the range in which the additives do not deteriorate the function of the water-resistant grease. As the additives, it is possible to list an antioxidant such as a phenol compound, a sulfur-containing compound, and the like; a wear inhibitor such as a sulfur-containing compound, a phosphorus-sulfur-containing compound, and the like; a rust-preventive agent such as metal sulfonate, polyvalent alcohol ester, and the like; and a detergent dispersant such as metal sulfonate, metal phosphate, and the like. These additives can be added to the base grease singly or in combination of two or more kinds thereof.

Figure 1:
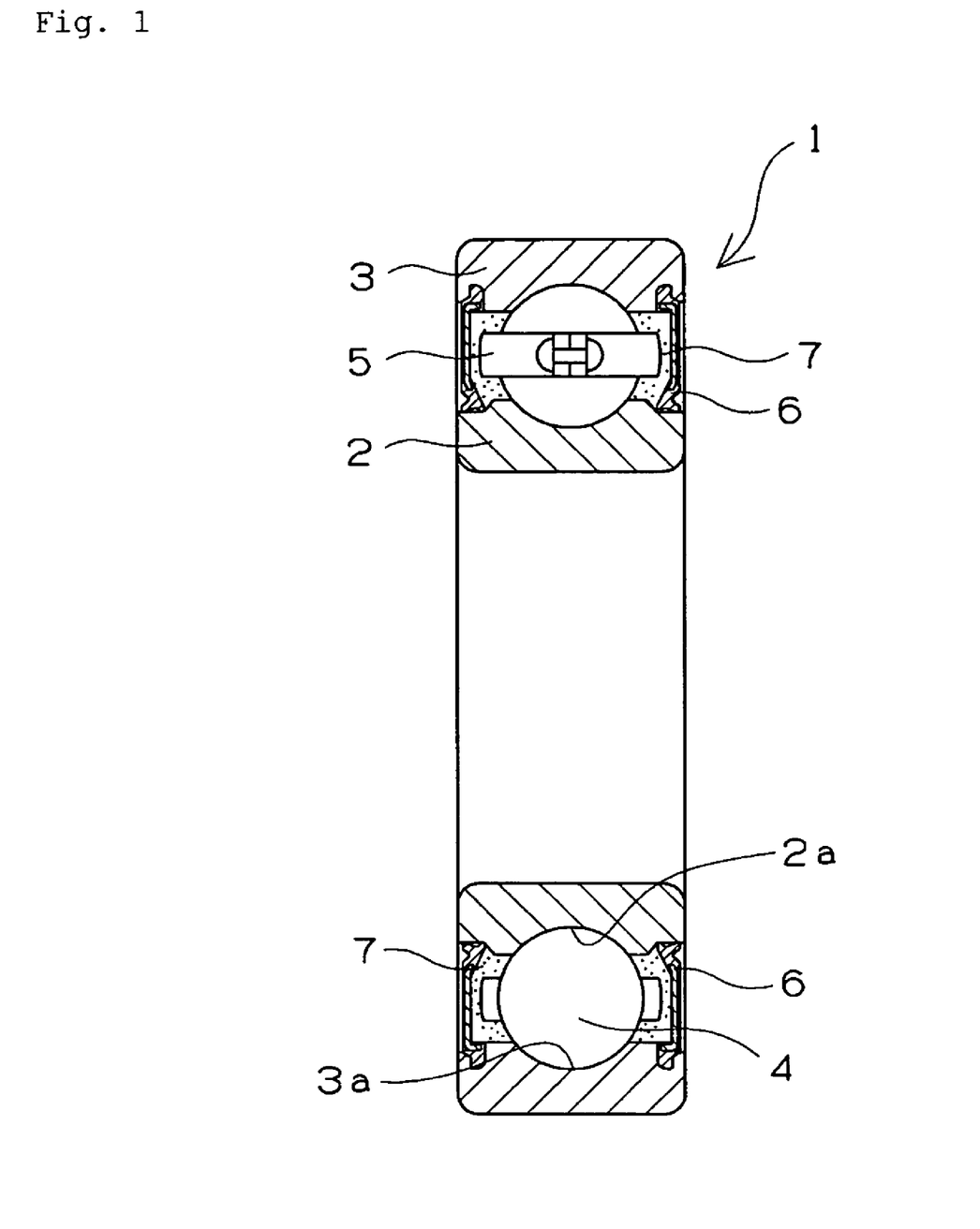
FIG. 1 is a sectional view of a rolling bearing.

An example of the rolling bearing of the present invention is shown in FIG. 1. FIG. 1 is a sectional view of the grease-enclosed rolling bearing.

A rolling bearing 1 includes an inner ring 2 having an inner ring rolling surface 2*a* on its peripheral surface, an outer ring 3 concentric with the inner ring 2 and having an outer ring rolling surface 3*a* on its inner peripheral surface, and a plurality of rolling elements 4 disposed between the inner ring rolling surface 2*a* and the outer ring rolling surface 3*a*. The rolling bearing 1 further includes a retainer 5 holding the plurality of rolling elements 4, and a sealing member 6 fixed to the outer ring 3 and the like. The water-resistant grease is enclosed essentially on the periphery of the rolling elements 4.

FIG. 2 shows an example of the hub bearing (third-generation hub bearing for use in driven wheel) of the present invention. FIG. 2 is a sectional view of the hub bearing. A hub bearing 26 has an inward member 25 having a hub ring 21 and an inner ring 22, an outward member 23 consisting of an outer ring, and double row rolling elements 24, 24. The hub ring 21 has a wheel-mounting flange 21*d* integral with the hub ring 21 at its one end for mounting a wheel (not shown) thereon. Formed on a periphery of the hub ring 21 are an inside rolling surface 21*a* and a small-diameter stepped portion 21*b* extended axially from the inside rolling surface 21*a*.

In the present specification, "outside" in the axial direction means an outer side in the widthwise direction in a state where the hub bearing is mounted on a car, whereas "inside" means a central side in the widthwise direction.

The inner ring 22 having an inside rolling surface 22*a* formed on the periphery thereof is fitted in the small-diameter stepped portion 21*b* of the hub ring 21 by press fit. The removal of the inner ring 22 from the hub ring 21 in the axial direction is prevented by a caulking portion 21*c* formed by plastically deforming an end of the small-diameter stepped portion 21*b* of the hub ring 21 radially outward.

The outward member 23 has on its periphery a flange 23*b* which is mounted on the car and integral therewith and has on the inner periphery the double row rolling elements 24, 24 rollingly accommodated between the outside rolling surfaces 23*a*, 23*a* and the inside rolling surfaces 21*a*, 22*a* opposed to the double row outside rolling surfaces 23*a*, 23*a*.

The water-resistant grease of the present invention is enclosed in a space surrounded with a sealing member 27, the outward member 23, a sealing member 28, the inward member 25, and the hub ring 21 so that the water-resistant grease covers the periphery of the double row rolling elements 24, 24 sandwiched between the outward member 23 and the inward member 25 and lubricates a rolling contact portion between the rolling surfaces of the rolling elements 24, 24 and the inside rolling surfaces 21a, 22a as well as the outside rolling surfaces 23a, 23a.

The water-resistant grease of the present invention can be also used as bearings, other than the hub bearing, to which a high load is applied.

As materials that can be used for the hub bearing of the present invention, it is possible to list bearing steel, carburized steel, and carbon steel for machine structural use. Of these materials, it is preferable to use the carbon steel for machine structural use such as S53C which has a favorable forgeability and is inexpensive. The carbon steel for machine structural use is used after the rolling fatigue strength of a bearing portion is secured by heat-treating it with a high-frequency wave. But even though the carbon steel for machine structural use is heat-treated with the high-frequency wave, the carbon steel for machine structural use has a low surface strength because it contains a small amount of an alloy component and is thus inferior to the bearing steel in the resistance to the peeling starting from the surface thereof at the sliding portion. To solve the problem of the peeling of the carbon steel for machine structural use starting from the surface of the bearing, by improving the lubricating performance of the water-resistant grease of the present invention at the sliding portion, the water-resistant grease is capable of preventing the peeling starting from the surface of the carbon steel for machine structural use used for the hub bearing.

EXAMPLES

The present invention is concretely described below by way of examples and comparative examples but not limited thereby.

Examples 1 and 2

A urea compound was uniformly dispersed as a thickener in mineral oil which is non-water-based base oil to prepare mineral oil/urea-based base grease (worked penetration No. 2 grade in JIS, worked penetration: 265 to 295).

In 2000 g of mineral oil (Turbine 100 produced by Nippon Oil Corporation, kinematic viscosity at 40° C.: 100 mm$^2$/second), 231.7 g of diphenylmethane-4,4'-diisocyanate, 86.2 g of aniline, and 91.7 g of cyclohexylamine were reacted with one another. Base grease in which a generated urea compound was uniformly dispersed was obtained. An additive was added to the base grease at the mixing ratio shown in table 1 to obtain specimen grease of each example.

An oil film formation factor test 1 and a water dispersion confirmation test described below were conducted on the obtained specimen grease to measure the oil film formation rate and dispersibility thereof in the water and the diameter of water particle. Table 1 shows the results.

<Oil Film Formation Factor Test 1>

Bearing used: An angular ball bearing 7006ADLLB was used simulating a hub bearing.

Test condition: 1.0 g of the obtained grease for the hub bearing was enclosed in the angular ball bearing 7006ADLLB. The oil film formation rate of each specimen grease was measured after water was poured to the grease at 0.35 ml/hour for 10 hours while rotating the angular ball bearing 7006ADLLB at 1000 rpm with a radial load of 650 N and an axial load of 200 N being applied thereto. The oil film formation rate was measured by using an electric resistance method.

<Water Dispersion Confirmation Test>

To check the extent of dispersion of the water in the grease, the water dispersion confirmation test was conducted as follows:

The water and the grease were so mixed with each other and stirred that the water content was 20 parts by weight for the total amount of the water and the grease which was 100 parts by weight. After the mixture was collected on a glass plate, a spacer shim having a thickness of 0.025 mm was placed at both ends of the glass plate. With another glass plate placed on the spacer shim to sandwich the spacer shim between both glass plates, a load was uniformly applied to the entire glass plates. The grease was spread to measure the diameter of a water particle present in the grease with a microscope.

Example 3 and Comparative Examples 1 and 2

A urea compound was uniformly dispersed as a thickener in mineral oil which is base oil to prepare mineral oil/urea-based base grease (worked penetration No. 2 grade in JIS, worked penetration: 265 to 295).

In 2000 g of mineral oil (Super oil C produced by Nippon Oil Corporation, kinematic viscosity at 40° C.: 100 mm$^2$/second), 234.8 g of diphenylmethane-4,4'-diisocyanate and 174.8 g of aniline were reacted with each other. Base grease in which a generated urea compound was uniformly dispersed was obtained. An additive was added to the base grease at the mixing ratio shown in table 1 to obtain grease for a hub bearing.

The obtained specimen grease for a hub bearing was evaluated in the same manner as example 1. Table 1 shows the results.

TABLE 1

|  | Example | | | Comparative example | |
| --- | --- | --- | --- | --- | --- |
|  | 1 | 2 | 3 | 1 | 2 |
| Base grease (part by weight) | | | | | |
| Base oil: Mineral oil [1] | 83 | 83 | 83 | 83 | 83 |
| Thickener: Diurea [ratio of terminal group: aromatic group [2]/alicyclic group [3]] | 17 [1/1] | 17 [1/1] | 17 [1/1] | 17 [1/0] | 17 [1/0] |
| (Total of base grease) | (100) | (100) | (100) | (100) | (100) |

TABLE 1-continued

|  | Example | | | Comparative example | |
| --- | --- | --- | --- | --- | --- |
|  | 1 | 2 | 3 | 1 | 2 |
| Additive (part by weight) | | | | | |
| Calcium sulfonate [4] | 2 | — | 1 | — | — |
| Sorbitan monooleate [5] | — | 2 | 0.5 | — | — |
| Aliphatic amine [6] | — | — | — | 2 | — |
| Zinc-based wear adjuster [7] | — | — | — | — | 2 |
| Characteristics | | | | | |
| Dispersion of water in lubricant | Uniform | Uniform | Uniform | Nonuniform | Nonuniform |
| Diameter of water particle (μm) | 15 | 20 | 15 | 100 | 100 |
| Oil film formation rate (%) | 90 | 85 | 90 | 50 | 0 |

[1] Turbine 100 produced by Nippon Oil Corporation, kinematic viscosity at 40° C.: 100 mm2/second
[2] Aniline
[3] Cyclohexylamine
[4] Sulfol CA-45 produced by Matsumura Oil Co., Ltd.
[5] Reagent produced by Wako Pure Chemical Industries, Ltd.
[6] Vanlube SL produced by R. T. Vanderbilt Company, Inc.
[7] Lubrizol 1395 produced by Lubrizol Corporation As shown in table 1, the diameter of the particle of water which could be uniformly dispersed in the grease was very small. Regarding the oil film formation rate, the grease in which the water was uniformly dispersed kept the formed oil film, whereas the grease in which the water nonuniformly dispersed did not form the oil film.

From the above results, the grease incapable of uniformly dispersing the water penetrated thereinto could not form the oil film and there is a fear that the bearing peels from the surface thereof. On the other hand, the grease capable of uniformly dispersing the water therein is capable of forming the oil film. Thus the grease is capable of preventing the surface of the bearing from being damaged.

Examples 4 through 14 and Comparative Examples 3 through 8

A urea compound was uniformly dispersed as a thickener in mineral oil which is non-water-based base oil to prepare mineral oil/urea-based base grease (worked penetration No. 2 grade in JIS, worked penetration: 265 to 295).

In 2000 g of mineral oil (Turbine 100 produced by Nippon Oil Corporation, kinematic viscosity at 40° C.: 100 mm$^2$/second), 231.7 g of diphenylmethane-4,4'-diisocyanate, 86.2 g of aniline, and 91.7 g of cyclohexylamine were reacted with one another. Base grease in which a generated urea compound was uniformly dispersed was obtained. An additive was added to the base grease at the mixing ratio shown in tables 2 and 3 to obtain specimen grease of each of the examples and the comparative examples.

An oil film formation factor test 2, a bearing life test, and measurement of a saturated amount of water described below were conducted on the obtained specimen grease to measure the oil film formation rate, bearing lifetime, and saturated amount of water thereof, and to check whether rust was generated. Tables 2 and 3 show the results.

<Oil Film Formation Factor Test 2>

Bearing used: The angular ball bearing 7006ADLLB was used simulating a hub bearing.

Test condition: 1.0 g of the obtained specimen grease was enclosed in the angular ball bearing 7006ADLLB. The oil film formation factor of each specimen grease was measured after water was poured to the grease at 1.0 ml/hour for 10 hours while rotating the angular ball bearing 7006ADLLB at 1000 rpm with a radial load of 8000 N and an axial load of 3000 N being applied thereto. The oil film formation rate was measured by using the electric resistance method.

<Bearing Life Test>

Bearing used: The angular ball bearing 7006ADLLB was used simulating the hub bearing.

Test condition: 1.0 g of the obtained specimen grease was enclosed in the angular ball bearing 7006ADLLB. The life of the bearing was measured after water was poured to the grease at 1.0 ml/hour while rotating the angular ball bearing 7006ADLLB B at 1000 rpm with a radial load of 8000 N and an axial load of 3000 N being applied thereto. As the life of the bearing, the period of time until the bearing vibrated greatly owing to damage of one of the rolling surface of the outer ring, the rolling surface of the inner ring, and the steel ball was measured.

<Measurement of Saturated Amount of Water>

Water was added to a given amount of each specimen grease changing the addition rate of the water by 5 wt % among the specimen grease. The mixture was manually stirred by using a micro-spatter. The maximum amount of added water which could be dispersed in the specimen grease was found. The saturated amount of water was computed by using a formula shown below. Whether the added water could be dispersed in the grease or not was determined as follows: After the specimen grease was collected on a glass plate, a spacer shim having a thickness of 0.025 mm was placed at both ends of the glass plate. With another glass plate placed on the spacer shim to sandwich the spacer shim between both glass plates, a load of 600 N was uniformly applied to the entire glass plates. The specimen grease was spread to observe it with a microscope. When the diameter of a largest water particle of water particles present in the grease was not more than 50 μm, it was determined that the water could be dispersed in the grease.

Saturated amount of water (wt %)=Maximum amount of water dispersible in grease×100/(Weight of specimen grease+Maximum amount of water dispersible in grease)

TABLE 2

|  | Example | | | | | Comparative example | | |
|---|---|---|---|---|---|---|---|---|
|  | 4 | 5 | 6 | 7 | 8 | 3 | 4 | 5 |
| Base grease (part by weight) | | | | | | | | |
| Base oil: Mineral oil [1] | 83 | 83 | 83 | 83 | 83 | 83 | 83 | 83 |
| Thickener: Diurea [ratio of terminal group: aromatic group [2]/alicyclic group [3]] | 17 [1/1] | 17 [1/1] | 17 [1/1] | 17 [1/1] | 17 [1/1] | 17 [1/1] | 17 [1/1] | 17 [1/1] |
| (Total of base grease) | (100) | (100) | (100) | (100) | (100) | (100) | (100) | (100) |
| Additive (part by weight) | | | | | | | | |
| Calcium sulfonate [4] | 2 | — | — | — | 4 | — | — | 0.5 |
| Polyethylene glycol stearate (HLB value: 18) [5] | — | 1 | 2 | — | — | — | — | — |
| Polyethylene glycol stearate (HLB value: 5) [6] | — | — | — | 2 | — | — | — | — |
| Sorbitan monooleate [7] | — | — | — | — | — | 4 | — | — |
| Characteristics | | | | | | | | |
| Saturated amount of water (wt %) | 35 | 40 | 45 | 50 | 60 | 80 | 0 | 20 |
| Oil film formation rate (%) | 90 | 94.2 | 96.2 | 94.4 | 66 | 40 | 13.4 | 22 |
| Rusted or not | Not rusted | Not rusted | Not rusted | Not rusted | Not rusted | Rusted | Rusted | Not rusted |
| Life of bearing (hour) | 116 | — | 97 | 99 | — | 10 | 44 | — |

[1] Turbine 100 produced by Nippon Oil Corporation, kinematic viscosity at 40° C.: 100 mm2/second
[2] Aniline
[3] Cyclohexylamine
[4] NA-SUL CA50 produced by King Industries, Inc.
[5] Produced by Nihon Emulsion Co., Ltd.
[6] Produced by Nihon Emulsion Co., Ltd.
[7] Reagent

TABLE 3

|  | Example | | | | | | Comparative example | | |
|---|---|---|---|---|---|---|---|---|---|
|  | 9 | 10 | 11 | 12 | 13 | 14 | 6 | 7 | 8 |
| Base grease (part by weight) | | | | | | | | | |
| Base oil: Mineral oil [1] | 80 | 80 | 80 | 80 | 80 | 80 | 80 | 80 | 80 |
| Thickener: Diurea [ratio of terminal group: aromatic group [2]/alicyclic group [3]] | 20 [1/1] | 20 [1/1] | 20 [1/1] | 20 [1/1] | 20 [1/1] | 20 [1/1] | 20 [1/1] | 20 [1/1] | 20 [1/1] |
| (Total of base grease) | (100) | (100) | (100) | (100) | (100) | (100) | (100) | (100) | (100) |
| Additive (part by weight) | | | | | | | | | |
| Amine-based antioxidant [4] | 1 | 1 | 1 | 1 | 1 | 1 | 1 | 1 | 1 |
| Calcium sulfonate (basic value: 52) [5] | 1 | — | 1 | 1 | 0.5 | 2 | — | 1 | — |
| Calcium sulfonate (basic value: 500) [6] | — | 1 | — | — | — | — | — | — | — |
| Sorbitan monooleate [7] | 0.5 | 0.5 | 1 | 0.2 | 0.5 | 0.5 | — | — | 4 |
| SEC-ZnDTP [8] | 2 | 2 | 2 | 2 | 2 | 2 | — | 2 | — |
| Characteristics | | | | | | | | | |
| Saturated amount of water (wt %) | 45 | 45 | 60 | 30 | 40 | 50 | <10 | 25 | 80 |
| Oil film formation rate (%) | 97 | 95 | 80 | 85 | 92 | 90 | 55 | 60 | 63 |
| Life of bearing (hour) | >130 | 110 | 90 | 90 | 120 | 115 | 50 | 60 | 10 |

[1] Turbine 100 produced by Nippon Oil Corporation, kinematic viscosity at 40° C.: 100 mm2/second
[2] Aniline
[3] Cyclohexylamine
[4] Nocrac AD-F produced by Ouchi Shinko Chemical Industrial Co., Ltd.
[5] NA-SUL CA50 produced by King Industries, Inc.
[6] Bryton C500 produced by WITCO Chemical Corp.
[7] Reagent
[8] Lubrizol 677A produced by Lubrizol Corporation As shown in tables 2 and 3, a high oil film formation rate can be obtained in a region in which the saturated amount of water is in the range of 30 to 60 wt % (particularly 40 to 50 wt %).

When water penetrates into the bearing, the grease having the saturated amount of water at less than 30 wt % or more than 60 wt % is incapable of forming the oil film. Thus metal contact occurs or rust is generated. The grease having the saturated amount of water in the range of 30 to 60 wt % is capable of forming the oil film. Thus there is a low degree of danger that metal contact may occur. Therefore the bearing has a long life, and the generation of rust can be prevented.

As shown in table 3, when water penetrates into the bearing, the bearing of the example 9 containing the additives shown in table 3 has a long life. Therefore the grease of the example 9 is effective for bearings used in environment in which water is liable to penetrate thereinto, car wheels, railway vehicles, steel rolling machines, and the like.

Examples 15 through 18 and Comparative Examples 9 and 10

A urea compound was uniformly dispersed as a thickener in mineral oil which is non-water-based base oil to prepare mineral oil/urea-based base grease (worked penetration No. 2 grade in JIS, worked penetration: 265 to 295).

In 2000 g of mineral oil (Turbine 100 produced by Nippon Oil Corporation, kinematic viscosity at 40° C.: 100 mm$^2$/second), 231.7 g of diphenylmethane-4,4'-diisocyanate, 86.2 g of aniline, and 91.7 g of cyclohexylamine were reacted with one another. Base grease in which a generated urea compound was uniformly dispersed was obtained. An additive was added to each base grease at the mixing ratio shown in table 4 to obtain specimen grease.

The measurement of the diameter of a water particle, the oil film formation factor test 2, and the bearing life test described below were conducted on each obtained specimen grease to measure the diameter of the water particle, the oil film formation rate of the grease, and the lifetime of the bearing. Table 4 shows the results.

little danger that metal contact may occur, and thus the bearing has a long life and the generation of rust can be prevented.

INDUSTRIAL APPLICABILITY

In the water-resistant grease of the present invention, the dispersant allowing water to be uniformly dispersed in the grease is added to the base grease which comprises the non-water-based base oil and the thickener. Thereby even though the water is mixed into the water-resistant grease during the operation of the grease-enclosed bearing, it is possible to restrain the action of the water that prevents the water-resistant grease from forming the oil film. Therefore the water-resistant grease is capable of restraining the bearing from peeling from the surface thereof and prolongs the life of the bearing in which a bearing ring is composed of the carbon steel for machine structural use even though the lubricating condition is strict. Thus the water-resistant grease can be preferably utilized for bearings for use in railway vehicles, building machines, automotive electric auxiliary machines,

TABLE 4

|  | Example | | | | Comparative example | |
| --- | --- | --- | --- | --- | --- | --- |
|  | 15 | 16 | 17 | 18 | 9 | 10 |
| Base grease (part by weight) | | | | | | |
| Base oil: Mineral oil [1] | 83 | 83 | 83 | 83 | 83 | 83 |
| Thickener: Diurea [ratio of terminal group: aromatic group [2]/alicyclic group [3]] | 17 [1/1] | 17 [1/1] | 17 [1/1] | 17 [1/1] | 17 [1/1] | 17 [1/1] |
| (Total of base grease) | (100) | (100) | (100) | (100) | (100) | (100) |
| Additive (part by weight) | | | | | | |
| Calcium sulfonate [4] | 2 | — | — | — | — | 0.5 |
| Polyethylene glycol stearate (HLB value: 18) [5] | — | 2 | — | — | — | — |
| Polyethylene glycol stearate (HLB value: 5) [6] | — | — | 2 | — | — | — |
| Sorbitan monooleate [7] | — | — | — | 2 | — | — |
| Characteristics | | | | | | |
| Diameter of water particle D(20) (μm) | 15 | 19.5 | 19 | <1 [8] | 100 | 60 |
| Oil film formation rate (%) | 90 | 96.2 | 94.4 | 64 | 13.4 | 22 |
| Life of bearing (hour) | 116 | 97 | 99 | — | 44 | 35 |

[1] Turbine 100 produced by Nippon Oil Corporation, kinematic viscosity at 40° C.: 100 mm2/second
[2] Aniline
[3] Cyclohexylamine
[4] NA-SUL CA50 produced by King Industries, Inc.
[5] Produced by Ninon Emulsion Co., Ltd.
[6] Produced by Nihon Emulsion Co., Ltd.
[7] Reagent
[8] Particle diameter is nonmeasurable because of very fine dispersion of water As shown in table 4, a high oil film formation rate can be obtained in a region in which the diameter D(20) of the water particle is not more than 5 μm (particularly 15 to 25 μm).

When water penetrates into the bearing, the grease containing water particle having the diameter D(20) of more than 50 μm is incapable of forming the oil film. Thus there is a fear that metal contact occurs. On the other hand, the grease containing water particle having the diameter D(20) of not more than 50 μm is capable of forming the oil film. Thus there is a and the like which are used in environment where there is a constant possibility that water penetrates thereinto and are thus demanded to have a high wear resistance and a long-term durability.

EXPLANATION OF REFERENCE SYMBOLS
AND NUMERALS

| 1: | rolling bearing |
| 2: | inner ring |
| 3: | outer ring |
| 4: | rolling element |
| 5: | retainer |
| 6: | sealing member |
| 7: | lubricating grease |
| 21: | hub ring |
| 21a: | inside rolling surface |
| 21b: | small-diameter stepped portion |
| 21c: | caulking portion |
| 21d: | wheel-mounting flange |
| 22: | inner ring |
| 22a: | inside rolling surface |
| 23: | outward member |
| 23a: | outside rolling surface |
| 23b: | car body-mounting flange |
| 24: | rolling element |
| 25: | inward member |
| 26: | hub bearing |
| 27: | sealing member |
| 28: | sealing member |

The invention claimed is:

1. Water-resistant grease comprising a base grease consisting of a non-water-based base oil and a thickener; and an additive added to said base grease,
wherein said thickener comprises an alicyclic-aromatic urea compound synthesized by reaction among an aromatic diisocyanate, an alicyclic monoamine and an aromatic monoamine; and 1 to 40 parts by weight of said thickener is added to 100 parts by weight of said base grease,
wherein said additive contains a water dispersant capable of uniformly dispersing water in said water-resistant grease,
wherein said water dispersant consists of calcium sulfonate and sorbitan monooleate,
wherein a basic value of said calcium sulfonate is 50 to 500,
wherein a mixing amount of said water dispersant is so selected that a saturated amount of water, dispersible in said water-resistant grease with the diameter of a largest water particle not more than 50 μm, is from 30 to 60 wt %,
wherein 0.5 to 2 parts by weight of said calcium sulfonate and 0.2 to 1 part by weight of said sorbitan monooleate arc added to 100 parts by weight of said base grease,
wherein said additive contains a zinc dithiophosphate and an amine-based antioxidant.

2. Water-resistant grease according to claim 1, wherein two parts by weight of said zinc dithiophosphate and one part by weight of said amine-based antioxidant are added to 100 parts by weight of said base grease.

3. Water-resistant grease according to claim 1, wherein said non-water-based base oil is a mineral oil.

4. Water-resistant grease according to claim 1, wherein a diameter of a particle of water dispersed by said water dispersant is not more than 50 μm when said base grease has a water content of 20 wt % for a total amount of said base arease, said water dispersant, and said water.

5. A rolling bearing comprising an inner ring, an outer ring, and a rolling element interposed between said inner ring and said outer ring; and the water-resistant grease according to claim 1 is enclosed on a periphery of said rolling element.

6. A hub bearing in which the water-resistant grease according to claim 1 is enclosed at a sliding portion composed of carbon steel for machine structural use.

7. Water-resistant grease according to claim 1, wherein said alicyclic monoamine is cyclohexylamine and said aromatic monoamine is aniline.

8. Water-resistant grease according to claim 1, wherein said thickener is prepared by reaction among an aromatic diisocyanate, cyclohexylamine and aniline; and a ratio of terminal groups in said thickener that is represented by aromatic group: alicyclic group is 1:1.

9. Water-resistant grease according to claim 1, wherein said aromatic diisocyanate is diphenyl methane-4.4'-diisocyante.

* * * * *